United States Patent
Moritz et al.

(10) Patent No.: US 8,237,794 B2
(45) Date of Patent: Aug. 7, 2012

(54) METHOD FOR DETECTING AN OPTICAL STRUCTURE

(75) Inventors: Rainer Moritz, Filderstadt (DE); Alexander Maass, Leonberg (DE); Jens Schick, Herrenberg (DE); Alexander Wuerz-Wessel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1530 days.

(21) Appl. No.: 11/664,347

(22) PCT Filed: Aug. 17, 2005

(86) PCT No.: PCT/EP2005/054051
§ 371 (c)(1),
(2), (4) Date: Mar. 30, 2007

(87) PCT Pub. No.: WO2006/037688
PCT Pub. Date: Apr. 13, 2006

(65) Prior Publication Data
US 2007/0299596 A1    Dec. 27, 2007

(30) Foreign Application Priority Data
Oct. 1, 2004   (DE) .......................... 10 2004 048 400

(51) Int. Cl.
*H04N 7/18*    (2006.01)
*H04N 5/228*   (2006.01)
(52) U.S. Cl. ................. 348/148; 348/208.99; 348/208.2
(58) Field of Classification Search .................. 348/148, 348/208.2, 208.99
See application file for complete search history.

(56) References Cited

U.S. PATENT DOCUMENTS

| | | | |
|---|---|---|---|
| 6,535,114 B1 * | 3/2003 | Suzuki et al. | 340/435 |
| 6,753,902 B1 * | 6/2004 | Kashiwazaki | 348/119 |
| 7,095,432 B2 * | 8/2006 | Nakayama et al. | 348/148 |

FOREIGN PATENT DOCUMENTS

| | | |
|---|---|---|
| DE | 102 29 336 | 1/2004 |
| DE | 102 46 066 | 4/2004 |
| EP | 1 120 746 | 8/2001 |
| JP | 06-215134 | 8/1994 |
| WO | WO 02/50770 | 6/2002 |

OTHER PUBLICATIONS

Thompson, W.B. et al., "Dynamic occlusion analysis in optical flow fields", IEEE Transactions on Pattern Analysis and Machine Intelligence, IEEE Service Center, Los Alamitos, CA, vol. PAMI-7, No. 4, Jul. 1985, pp. 374-383.

(Continued)

*Primary Examiner* — Backhean Tiv
*Assistant Examiner* — Alan S Chou
(74) *Attorney, Agent, or Firm* — Kenyon & Kenyon LLP

(57) ABSTRACT

A method for detecting an optical structure from image sequences of an image recording system. An optical flow field is derived from the image sequences of the image recording system. The vectors of the optical flow field are broken down into components by projection onto a coordinate system of the image recorded by the image recording system. At least one component of the flow vectors is analyzed for a change of direction. The image elements containing a change of direction of a vector component are connected to form a curve.

12 Claims, 4 Drawing Sheets

OTHER PUBLICATIONS

Enkelmann, W., "Obstacle Detection by evaluation of optical flow fields from image sequences", Image and Vision Computing, Guildford, GB, vol. 9, No. 3, Jun. 1991, pp. 160-168.

Broggi, A. et al., "Self-calibration of a stereo vision system for automotive applications", Proceedings of the 2001 IEEE International Conference on Robotics and Automation, ICRA 2001, Seoul, Korea, May 21-26, 2001, vol. 1 of 4, pp. 3698-3703.

Nayar, S.K., "Sphereo: Determining depth using two specular spheres and a single camera", Proceedings of the SPIE, Bellingham, VA, US, vol. 1005, Nov. 8, 1988, pp. 245-254.

Pollastri, F., "Projection center calibration motion", Pattern Recognition Letters Netherlands, vol. 14, No. 12, Dec. 1993, pp. 975-983.

Wurz-Wessel, A. et al., "Calibration of a free-form surface mirror in a stereo vision system", Intelligent Vehicle Symposium, 2002, IEEE Jun. 17-21, 2002, Piscataway, NJ, vol. 2, Jun. 17, 2002, pp. 471-476.

\* cited by examiner

METHOD FOR DETECTING AN OPTICAL STRUCTURE

FIELD OF THE INVENTION

The present invention relates to a method for detecting an optical structure.

BACKGROUND INFORMATION

For the purposes of this application, the term optical structure includes, for example, lines, in particular horizontal lines, within an image or outlines or contours of objects within an image detected by an image recording system. Such optical structures are detected by an image recording system which is in particular installed in a vehicle. The optical structures recorded by the image recording system are used, for example, for calibrating the image recording system or for detecting the position and movement of the vehicle carrying the image recording system. Information derived from the detected optical structures may be advantageously used for the vehicle dynamics control system of the vehicle and in particular for lateral guidance as well. In motor vehicles, the use of image recording systems is intended for the detection of the vehicle surroundings. In particular, the use of image recording systems is planned in conjunction with driver assistance systems. This makes it possible, for example, to use image recording systems for automatically regulating the distance of the motor vehicle from a vehicle traveling ahead. In order to enlarge the image detection range, the use of a plurality of image recording systems in one motor vehicle is also planned, it being possible for their detection ranges to overlap at least in part. In particular, the use of stereo cameras which are made up of two image recording systems which record generally the same scene is also provided.

Methods and devices for calibrating image recording systems in motor vehicles using a calibration object are conventional. A device and a method for calibrating an image recording system using a calibration object and a position reference sensor are described, for example, in German Patent Application No. DE 102 293 36.8 A1. Furthermore, a method for calibrating an image recording system in a motor vehicle using a calibration object is described in European Application No. EP 1 120 746 A2. The calibration object is connected to the motor vehicle and is aligned in relation to the motor vehicle via a mechanical adjusting device. The calibration is performed in relation to the longitudinal axis of the motor vehicle. The longitudinal axis may be constructed by using symmetrical features on the motor vehicle, in particular, the body. Due to production tolerances, however, this longitudinal axis does not line up with the geometric driving axis, which is defined by the bisecting line of the total toe-in angle of the rear axle. The deviations between the longitudinal axis and the geometric driving axis may not be disregarded for a measuring image recording system, in particular when it is used in driver assistance systems in motor vehicles, since the geometric driving axis determines the direction of travel when driving straight ahead, independent of the position of the longitudinal axis.

Furthermore, a method for calibrating at least one image recording system which is located at and/or in and/or on a motor vehicle, using at least one calibration object is described in German Patent Application No. DE 102 46 066 A1, the image recording system generating a first unit of image information of the calibration object, preferably in the form of at least one image data record, the motor vehicle assuming a first position in relation to the calibration object, the image recording system then generating a second unit of image information of the calibration object, preferably in the form of at least one image data record, the motor vehicle assuming a second position in relation to the calibration object, the change of position of the motor vehicle from the first position in relation to the calibration object for assuming the second position being accomplished by movement of the motor vehicle, and the alignment of the image recording system in relation to the geometric driving axis of the motor vehicle being determined from at least the first and second generated units of image information of the calibration object. Also described is a device for calibrating at least one image recording system, which is located at and/or in and/or on a motor vehicle, having at least one calibration object and at least one evaluation unit, which evaluates the image information of the at least one image recording system, the evaluation unit having means which make it possible to determine the alignment of the image recording system in relation to the geometric driving axis of the motor vehicle from at least a first and a second unit of image information of the calibration object, the image information preferably being present in the form of at least one image data record. In these known systems, the calibration object is situated outside of the vehicle, in a workshop for example, making it necessary to drive there specifically for this purpose.

A method for image detection using a television camera installed in a vehicle is described in Japanese Patent No. JP 06-215134 A1. In this case, the television camera is calibrated by detecting a part of the vehicle such as an edge of the hood in particular and the image position is corrected as a function of the position of the edge of the hood. This makes it possible in principle to calibrate an image recording system using onboard systems, making it unnecessary to make a special visit to a workshop in order to perform a calibration using calibration objects present there. Modern body shapes, however, pose considerable practical problems because present-day hoods frequently no longer have distinct edges, so that calibration based on edges is no longer possible. Furthermore, high-gloss paints commonly used today result in mirror effects that make it difficult to detect body structures using an image recording system.

A method and a device for compensating a misalignment of an image generation device is described in International Application No. WO 02/50770 A1. The method includes the following steps: generating a first image using a first image generation device and storing the first image, detecting first receiving points and/or first angles of first edges and/or first lines in the first image, comparing these data obtained from the first image to corresponding data from a second image and determining correction parameters if deviations are detected, as well as using correction parameters for compensating any detected misalignment of the image generating device. However, it is difficult to implement this method for image objects without distinct edges and with strongly reflective surfaces on image objects.

SUMMARY

An example embodiment of the present invention may avoid these disadvantages and may make it possible to detect optical structures such as, in particular, edges on vehicle components such as, in particular, the hood of the vehicle, even under difficult optical conditions. The detected optical structures are advantageous for calibrating an image recording system using onboard devices even in vehicles having a modern vehicle design and in the case of strongly reflective surfaces. Furthermore, an example method according to the present invention may be advantageous for detecting the roll angle or the roll rate of a vehicle.

In accordance with the present invention, the derivation of an optical flow field from image sequences detected by an image recording system and projection of the flow vectors of the optical flow field onto a coordinate system make it possible to detect a change of direction of components of the flow vectors of the flow field. Image elements that contain such a change of direction may be connected to form a curve that represents the optical structure.

BRIEF DESCRIPTION OF THE DRAWINGS

Exemplary embodiments of the present invention are described in greater detail below with reference to the figures.

DETAILED DESCRIPTION OF EXAMPLE EMBODIMENTS

For many applications in the field of video-based driver assistance systems, which have at least one image recording system for detecting the vehicle surroundings, the detection of optical structures is of great significance. For the purposes of this application, the term optical structure includes, for example, horizontal lines within an image detected by the image recording system or outlines or contours of objects within an image. The optical structures recorded by the image recording system are used, for example, for calibrating the image recording system or for detecting the position and movement of the vehicle carrying the image recording system. Information derived from the detected optical structures is furthermore advantageous for the vehicle dynamics control system of the vehicle and in particular for lateral guidance as well. For the calibration of onboard image recording systems, expensive stationary methods are still being carried out in the production plants of the vehicle manufacturers in order, for example, to determine and correct if necessary the installation position of the image recording system relative to the roadway. Besides this first calibration, however, it may also be important to determine the installation position of the image recording system during the operation of the vehicle in order to be able to identify potentially critical system states. A critical system state is present, for example, if the image recording system has separated from its mounting and no longer detects the detection range of the vehicle surroundings which is necessary for the specified functionality. If such a critical state is not identified in time and an image analysis is also performed, the data obtained in this manner may result in considerable malfunctions of the driver assistance system. Difficult conditions are also present when mirroring reflective surfaces such as in particular painted vehicle body parts are situated in the detection range of the image recording system. Since image editing processes are not able to differentiate the information in reflections from data obtained in direct view, occurring reflections may result in significant misinterpretations of the data obtained from the vehicle surroundings. An example embodiment of the present invention provides a solution for these problems by analyzing the optical flow detected by the image recording system.

Figure 1:
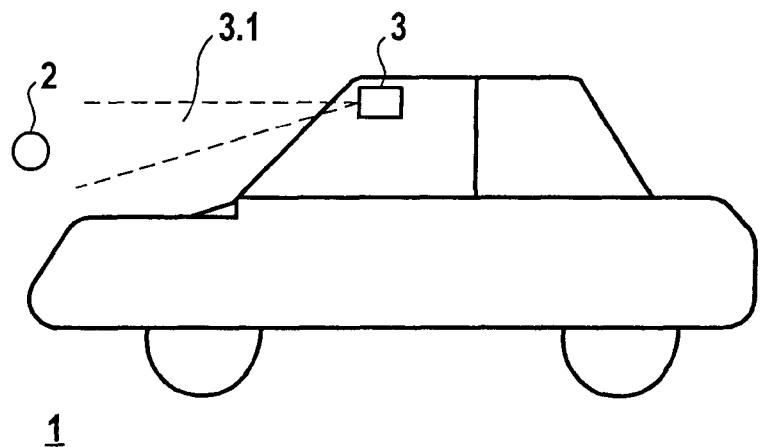
FIG. 1 shows a vehicle having an onboard image recording system.
Figure 2:
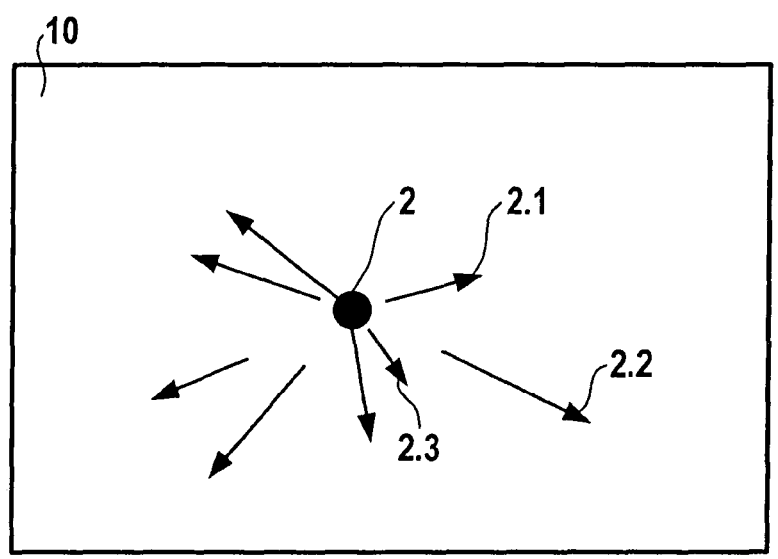
FIG. 2 shows the exemplary representation of a flow field.
Figure 3:
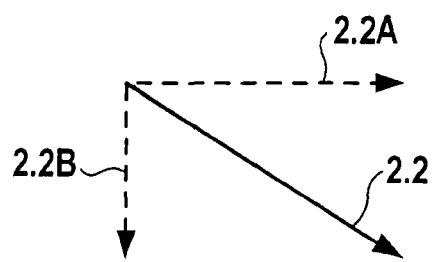
FIG. 3 shows the projection of a flow vector onto a vertical and a horizontal coordinate axis.
Figure 4:
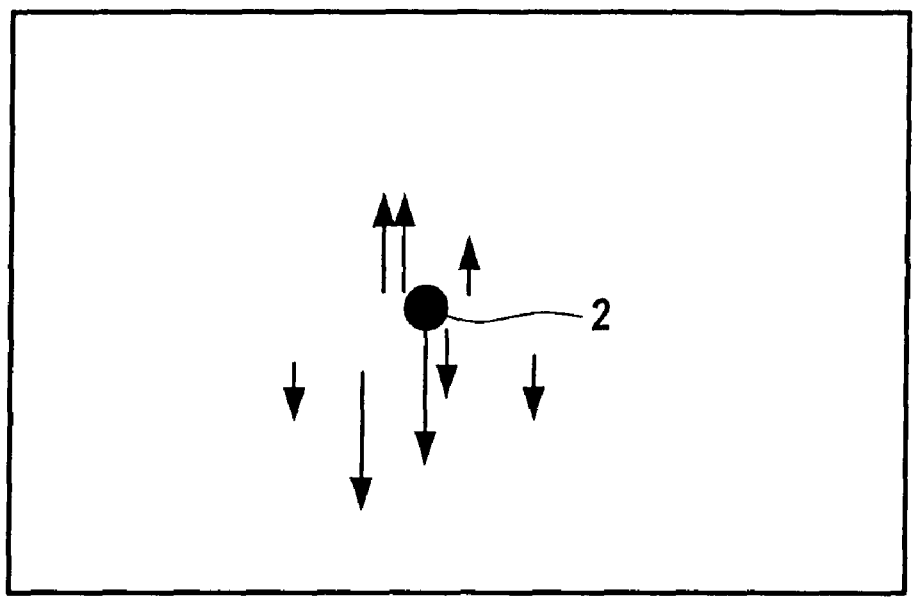
FIG. 4 shows the projection of the exemplary flow field depicted in FIG. 1.
Figure 5:
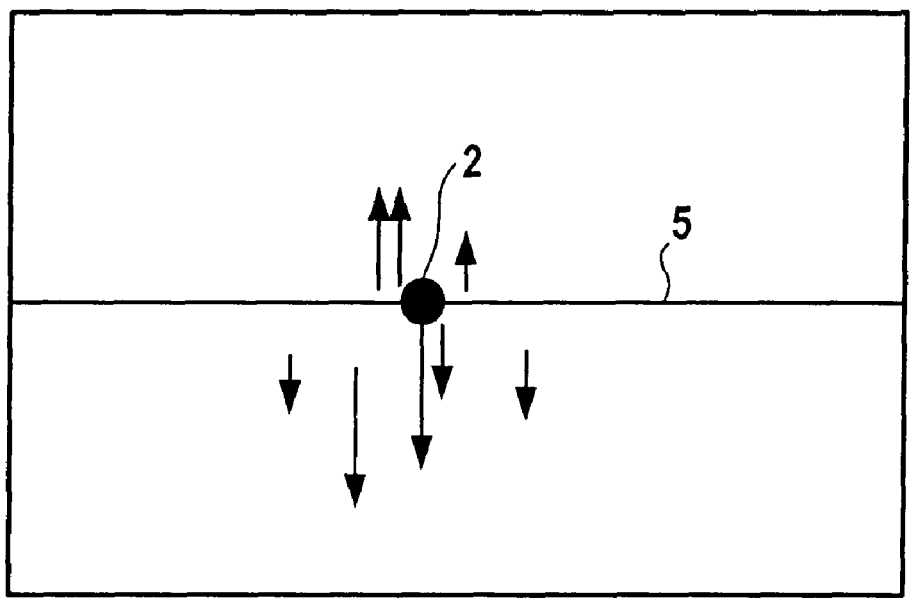
FIG. 5 shows the representation of a horizontal line derived from the exemplary flow field.
Figure 6:
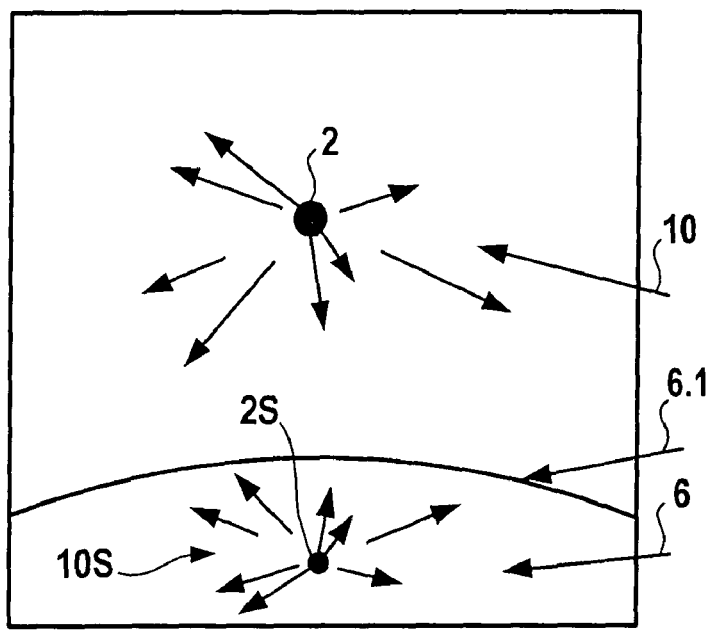
FIG. 6 shows the representation of a flow field measured directly and in reflection.
Figure 7:
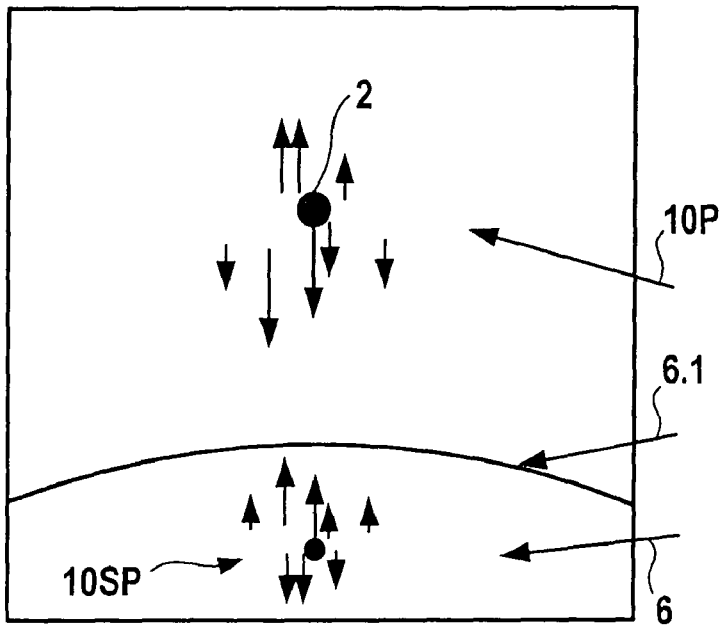
FIG. 7 shows the projection of the flow field measured directly and in reflection.
Figure 8:
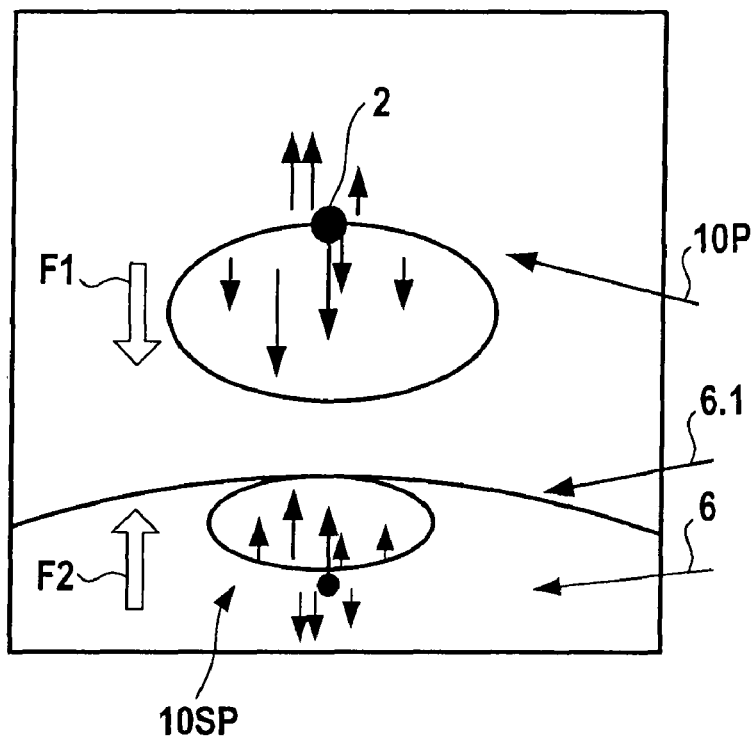
FIG. 8 shows the representation of the general flow direction and its folding on an edge of a reflective optical structure.
Figure 9:
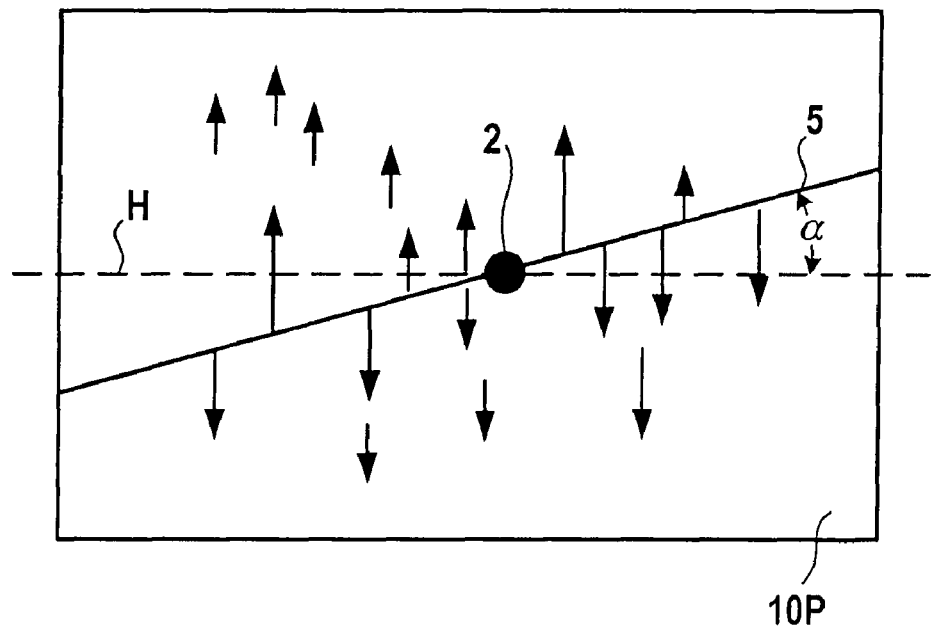
FIG. 9 shows the representation of a tilted horizontal line derived from a flow field.

FIG. 1 shows a vehicle 1 depicted schematically having an onboard image recording system 3. In this exemplary embodiment, image recording system 3 is situated in vehicle 1, preferably behind the windshield in the area of the inside rear view mirror. Detection range 3.1 of image recording system 3 is aligned in the forward direction of travel of vehicle 1. Image recording system 3 is preferably a video sensor, which is designed, for example, either as a CCD or CMOS camera. Preferably, image recording system 3 is a component of a driver assistance system, which supports the driver of vehicle 1 in operating vehicle 1 by, for example, making automatic steering control possible in vehicle 1. To that end, image recording system 3 detects image data from the surroundings of vehicle 1, which originate from detection range 3.1 of image recording system 3. Very high requirements are placed on the precision of image recording system 3. Such precision is in practice only achievable via regular calibration of image recording system 3, which must be carried out at the time the vehicle is manufactured, in the case of repair, and as part of scheduled maintenance. The calibration of image recording system 3 requires special calibration objects or calibration targets, which are normally placed in front of the vehicle in a workshop and must be precisely aligned with it. The exact alignment with the vehicle is laborious and requires special equipment. A method for calibrating onboard image recording systems autonomously using onboard equipment and the edge of the hood of the vehicle detected by the image recording system as a calibration object has already been described. However, this has frequently failed in practice due to the fact that as a result of modern vehicle design, the hoods of vehicles no longer have straight edges suitable for use as calibration objects. Reflective surfaces in detection range 3.1 of the image recording system also make it difficult to detect a calibration object such as the hood of vehicle 3. An example embodiment of the present invention makes it possible to calibrate an onboard image recording system autonomously, i.e., independent of a workshop, using onboard equipment even under difficult optical conditions by analyzing the optical flow. The comparison of images of an image sequence detected by the image recording system makes it possible to determine the optical flow, i.e., the shift of observed objects within the image sequence due to the relative movement between the image object and the image recording system. FIG. 2 shows the exemplary depiction of an optical flow field in an image detected by image recording system 3. The point in the center of the image denoted by reference numeral 2 represents the focus of expansion (FOE). Flow vectors 2.1, 2.2, 2.3, . . . emerge from focus of expansion 2. Via the optical flow, it is possible to make the following statements which are useful for understanding the present invention. Optical flow is generated by a relative movement between the image recording system and the objects detected in the detection range of the image recording system. There are stationary points or structures or image features that do not move in successive images of an image sequence. The reasons for this may be as follows: The observed objects are so far away that any relative movement that may be present in the depiction or recording of the image of the object by a quantized image sensor, such as a CCD or CMOS, of image recording system 3, is of no significance. Such objects are part of the background structures. The observed object does not move relative to the image recording system. These may be parts of the host vehicle or another vehicle traveling in front of the host vehicle at the same speed in the same direction. Such stationary points offer a mathematically strong condition for the presence of a focus of expansion 2 (FOE). The flow field, which is generated by a rotational movement (angular movement) of the image recording system, is generally independent of the offset in depth of the recorded objects. In contrast, in a translatory, even lateral movement, the flow field depends on the offset in depth of the objects. Close objects generate a relatively large optical flow while more distant objects generate a smaller optical flow. This means that a translatory movement influences the length of flow vectors 2.1, 2.2, 2.3, ... of the optical flow field but not the apparent origin of the vectors, focus of expansion 2 (FOE). This focus of expansion 2 is the projection of the direction of movement of the image recording system on the image plane. Since the image detected by the image recording system from its detection range 3.1 represents only a sub-area of the entire image plane, focus of expansion 2 must not necessarily lie in the detected image. In a purely rotational movement, for example, focus of expansion 2 lies in infinity in the corresponding direction of movement. As FIG. 2 illustrates, focus of expansion 2 appears to be the point of origin of all flow vectors 2.1, 2.2, 2.3, .... However, this strictly applies only to the recording of a static scene. Conversely, it is possible to detect moved objects from the observable flow vectors if the coordinates of focus of expansion 2 and the proper motion (rotation and translation) are known. From a mathematical perspective, focus of expansion 2 (assuming a static scene) may be characterized as the point having maximum divergence when rotation diminishes. In a purely translational movement, a standard focus of expansion is observed in principle. An additional rotational movement shifts the focus of expansion and this shift may be used to directly determine the angular proper motion of the image recording system or of the vehicle carrying the image recording system if the aperture angle of the optics used in the image recording system is known. In the presence of an adequately dense optical flow field, if the projection of the flow vectors of the optical flow field onto an, in particular, rectangular coordinate system is observed, in particular the vector component projected onto the vertical image axis, for each column or group of columns of the image made up of lines and columns, a kind of boundary line results at which the direction of the vector components arising by projection onto the vertical image axis folds. The focus of expansion (FOE) is also on this boundary line. However, this boundary line also describes the horizon of the present movement. If no pitching motion of the vehicle occurs, this horizon coincides with the horizon of the plane on which the vehicle and the image recording system joined to the vehicle are moving. If reflective surfaces are also present in detection range 3.1 of image recording system 3, for example, a painted hood of vehicle 1, the flow field is reflected on this reflective surface. If a component of the flow vector is projected onto the vertical image axis, this is noticed as a change of direction of this vector component. If the point at which this change of direction occurs is detected for each column or even a group of columns, a curve shape may be reconstructed from these individual points, which corresponds to the contour of the reflective surface. If the design of the vehicle and accordingly the exact position of the hood as well as the imaging properties of the image recording system are known, it is possible to infer the alignment of image recording system 3 with vehicle 1 from the curve of the contour of the reflective surface which is detected point-by-point. This fact will be explained once more in detail in the following with reference to FIGS. 3 through 8. FIG. 3 depicts the projection of a flow vector of an optical flow field onto a horizontal and vertical coordinate axis. For example, as a result, flow vector 2.2 (FIG. 2) is broken down into a horizontal component 2.2A and a vertical component 2.2B. The projection of the flow vectors of the flow field shown in FIG. 2 results in the depiction visible in FIG. 4. In it, only the components of the flow vectors projected onto the vertical image axis are reproduced while the components projected onto the horizontal axis are not shown. If, for each column of the image built up of lines and columns (FIG. 4), a search is made for the area in which a change of direction of the components of the flow vector projected onto the vertical axis has occurred, a point or an area of points is produced for each column. In the ideal case, this area includes exactly 1 pixel of the particular column. A connection of these points produces the horizontal line denoted by reference numeral 5 in FIG. 5. Focus of expansion 2 also lies on this line 5. If the folding of the vector components has occurred over a larger point area per column, it is possible to extend a correspondingly approximate connecting curve through these point areas that most closely approximates these point areas. FIG. 6 first shows a flow field 10 measured in direct view having a focus of expansion 2. FIG. 6 also shows flow field 10S including its focus of expansion 2S which is reflected on a reflective surface, for example, hood 6 of vehicle 1. The edge or contour of hood 6 acting as a reflective surface is denoted by reference numeral 6.1. FIG. 7 shows projected flow fields 10P and 10SP, with only the components projected onto the vertical axis being shown here. The reflective hood is in turn denoted by reference numeral 6, its edge by reference numeral 6.1. FIG. 8 shows a depiction essentially corresponding to that of FIG. 7. In this case, however, the emphasis is on the general flow directions of projected flow fields 10P and 10SP, represented by arrows F1 and F2. Arrow F1 represents the general flow direction of flow field 10P and arrow F2 the general flow direction of flow field 10SP. The depiction shows that the direction of the projected flow fields alternates or "folds" in the area of edge 6.1 of hood 6. As a result, it is possible to identify this optical structure with high reliability even under adverse conditions of observation. If the properties of vehicle 1 and its components are known, i.e., in the present case the installation position of hood 6, and if the imaging properties of image recording system 3 are known, it is possible to infer the alignment of image recording system 3 in relation to vehicle 1 from the position of edge 6.1 in the image obtained by image recording system 3. Comparing the detected position with a setpoint condition thus makes it possible to calibrate image recording system 3 online. At any time during the life of the vehicle, a calibration once performed is able to be easily checked in a simple manner. If the check reveals too severe a deviation from setpoints which are also not correctable using onboard equipment, a warning may advantageously be given to the driver, including, for example, the suggestion to take the vehicle to a workshop.

In a manner which is particularly advantageous, the method of the present invention may also be used to determine the roll angle of vehicle 1 and its roll rate. In addition to the condition and the course of the roadway, many video-based systems (image recording system 3) estimate the motion state of the vehicle. As precise as possible knowledge of the motion state facilitates, for example, the making of the decision as to whether it is possible to pass another vehicle safely or if the host vehicle is able to pass through a narrow gateway. If the roll angle is not corrected, this omission may have adverse effects on the estimation or determination of other state variables such as in particular the pitch angle or yaw angle. The rotational direction determined from these variables without consideration of the roll angle may include, for example, components of the roll angle. The result of this may be that a dynamic rolling motion and yawing motion are determined although only a pure yawing motion is taking place. The roll angle may be detected by observing horizontal line 5 depicted in FIG. 5. If line 5, as shown in FIG. 8, deviates from horizontal H, the angular deviation produces roll angle α. The roll rate may also be determined in a simple manner via continuous monitoring of the position of line 5 in relation to horizontal H.

What is claimed is:

1. A method for detecting an optical structure from image sequences of an image recording system, comprising:
   deriving an optical flow field from the image sequences of the image recording system;
   breaking down flow vectors of the optical flow field into axial components by projection onto axes of a coordinate system of an image recorded by the image recording system;
   for each line of image extending parallel to a selected axis of the coordinate system, examining axial components of the flow vectors extending parallel to the selected axis of the coordinate system for a change of direction; and
   connecting image elements containing the change of direction of the axial components of the flow vectors extending parallel to the selected axis of the coordinate system, to form a curve.

2. The method as recited in claim 1, wherein the flow vectors of the optical flow field are projected onto an orthogonal coordinate system, a horizontal axis of the coordinate system is aligned parallel to lines of the image and vertical axis of the coordinate system is parallel to columns of the image.

3. The method as recited in claim 2, wherein vector components of the flow vectors running parallel to the vertical axis of the coordinate system are examined for the change of direction.

4. The method as recited in claim 2, wherein the method is used for calibrating an image recording system using the curve.

5. The method as recited in claim 2, wherein the method is used for detecting a roll angle or a roll rate of a vehicle using the curve.

6. A method for detecting an optical structure from image sequences of an image recording system, comprising:
   deriving a first flow field from the image sequences of the image recording system;
   deriving a second optical flow field from the image sequence reflected on a reflective surface and detected by the image recording system;
   breaking down flow vectors of the first and second optical flow fields into axial components by projection onto axes of a coordinate system of an image recorded by the image recording system;
   for each line of image extending parallel to a selected axis of the coordinate system, examining axial components of the flow vectors of the first and second optical flow fields extending parallel to the selected axis of the coordinate system for a change of direction; and
   connecting image elements containing the change of direction of the axial components of the flow vectors extending parallel to the selected axis of the coordinate system, to form a curve.

7. The method as recited in claim 6, further comprising:
   determining an edge or contour of a reflective surface by comparing the change of direction of vector components between flow vectors obtained from direct image sequences and reflected image sequences.

8. The method as recited in claim 7, wherein an edge or contour of the hood of a vehicle is detected.

9. The method as recited in claim 6, wherein each column of the image is examined for a presence of a vector component folded in its direction.

10. The method as recited in claim 6, wherein groups of columns of the image are examined for a presence of a vector component folded in its direction.

11. A method for calibrating an onboard image recording system, comprising:
    recording image sequences from a detection range of the image recording system via the onboard image recording system, the detection range of the image recording system including a part of a vehicle structure of the vehicle;
    deriving optical flow fields from the image sequences recorded by the image recording system;
    breaking down flow vectors of the optical flow field into axial components by projection onto axes of a coordinate system of an image recorded by the image recording system;
    for each line of image extending parallel to a selected axis of the coordinate system, examining axial components of the flow vectors of the optical flow fields extending parallel to the selected axis of the coordinate system for a change of direction;
    connecting image elements containing the change of direction of the axial components of the flow vectors extending parallel to the selected axis of the coordinate system, to form a curve; and
    comparing a position of the curve with a setpoint position.

12. The method as recited in claim 11, wherein the vehicle structure is a hood of the vehicle.

* * * * *